United States Patent
Lieb

(10) Patent No.: US 6,623,153 B2
(45) Date of Patent: Sep. 23, 2003

(54) DEVICE AND METHOD FOR CHARGING A PLASTICIZING UNIT OF AN INJECTION MOLDING MACHINE

(75) Inventor: Peter Lieb, Rielasingen-Worblingen (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 0 days.

(21) Appl. No.: 10/298,348

(22) Filed: Nov. 18, 2002

(65) Prior Publication Data

US 2003/0063520 A1 Apr. 3, 2003

Related U.S. Application Data

(63) Continuation of application No. PCT/EP01/05724, filed on May 18, 2001.

(30) Foreign Application Priority Data

May 24, 2000 (DE) .......................................... 100 25 597

(51) Int. Cl.$^7$ ................................................. B29B 7/88
(52) U.S. Cl. ..................................................... 366/76.7
(58) Field of Search ............................... 366/76.1, 76.7, 366/76.8, 76.9, 76.91, 76.93; 425/580, 583, 585, 586

(56) References Cited

U.S. PATENT DOCUMENTS 4,397,630 A * 8/1983 Meeker
4,512,664 A * 4/1985 Oiwa
4,862,930 A * 9/1989 Sauerbruch
4,877,328 A * 10/1989 Muller et al.
5,022,847 A * 6/1991 Hehl
5,513,777 A * 5/1996 Yoda et al.
5,529,390 A * 6/1996 Giani et al.

FOREIGN PATENT DOCUMENTS

EP        483574      * 5/1992
GB       2231503      * 11/1990
WO      01/89796      * 11/2001

* cited by examiner

Primary Examiner—Charles E. Cooley
(74) Attorney, Agent, or Firm—Henry M. Feiereisen

(57) ABSTRACT

A charging device includes a feed pipe, constructed for connection to a plasticizing unit of an injection-molding machine, and a compaction cylinder, which has a lower end supported by the feed pipe and an upper end received in a retaining flange to which a support plate is attached, whereby the upper end of the compaction cylinder, the retaining flange and the support plate extend in a same plane. Support pillars bear two parallel displacement rails fixed to the retaining flange. A support base is displaceable on these displacement rails between two positions and supports a compaction ram and a storage container. A hydraulic adjustment cylinder moves the compaction ram and the storage container alternately in alignment with the compaction cylinder. To gain access to the feed pipe for cleaning during material change, the compaction cylinder is coupled to the compaction ram to form a structural unit which can be raised upwards.

12 Claims, 2 Drawing Sheets

DEVICE AND METHOD FOR CHARGING A PLASTICIZING UNIT OF AN INJECTION MOLDING MACHINE

CROSS-REFERENCES TO RELATED APPLICATIONS

This application is a continuation of prior filed copending PCT International application no. PCT/EP01/05724, filed May 18, 2001, which was not published in English and which designated the United States and on which priority is claimed under 35 U.S.C. §120, the disclosure of which is hereby incorporated by reference.

This application claims the priority of German Patent Application, Serial No. 100 25 597.3, filed May 24, 2000, pursuant to 35 U.S.C. 119(a)–(d), the disclosure of which is incorporated herein by reference.

BACKGROUND OF THE INVENTION

The present invention relates to a device and method for charging a plasticizing unit of an injection molding machine, preferably a ram-type compactor for moist polyester.

Typically, a charging device of a type involved here includes a feed pipe which is connected to a plasticizing unit and supports the lower end of a compaction cylinder. The upper end of the compaction cylinder is received in a retaining flange which is securely mounted to the feed pipe. Displacement rails are arranged at a distance to the retaining flange for allowing conjoint movement of a compaction ram with a piston and cylinder unit and a storage container by means of a drive unit alternately between a first position in which the compaction ram is aligned flush with the compaction cylinder and the storage container is ready for receiving new material, and a second position in which the storage container is aligned flush with the compaction cylinder for discharge of material into the compaction cylinder.

During a material change, measures have to be taken to remove residual material still present in the feed pipe of the charging device. Hereby, access to the feed pipe for cleaning purposes becomes problematic because the feed pipe can be reached only via the retaining flange and the compaction cylinder when the compaction ram is drawn. Accessibility is further complicated by the fact that the compaction ram can be moved out of the compaction cylinder only to a limited degree, so that accessibility into the interior of the compaction cylinder is already obstructed.

It would therefore be desirable and advantageous to provide an improved charging device which obviates prior art shortcomings and which is simple in structure while yet provides easy access to the feed pipe to permit a rapid and reliable cleaning action during a material change.

SUMMARY OF THE INVENTION

According to one aspect of the present invention, a device for charging a plasticizing unit of an injection molding machine, in particular ram-type compactor for moist polyester, includes a feed pipe constructed for connection to the plasticizing unit, a compaction cylinder having a lower end supported by the feed pipe and an upper end, a storage container receiving material for introduction into the compaction cylinder, a compaction ram constructed for movement into the compaction cylinder, a retaining flange securely supported by the feed pipe and receiving the upper end of the compaction cylinder, a drive unit for moving the compaction ram and the storage container between a first position in which the compaction ram is in alignment with the compaction cylinder for allowing the compaction ram to compress the material in the compaction cylinder, while the storage container can be charged with new material, and a second position in which the storage container is in alignment with the compaction cylinder, and a coupling unit for linking the compaction cylinder to the compaction ram.

The present invention resolves prior art problems by detachably connecting the compaction cylinder with the compaction ram to provide a structural unit that can be moved away from the feed pipe to create access thereto for cleaning purposes.

According to another feature of the present invention, the coupling unit may include at least one coupling piece which is swingably mounted to the upper end of the compaction cylinder and selectively secureable to the retaining flange and an upper end of the compaction ram.

According to another feature of the present invention, the coupling piece may be secured to the compaction cylinder and the retaining flange by a screwed connection.

According to another feature of the present invention, the coupling piece may be lockable like a ratchet in a recess in the compaction ram.

According to another aspect of the present invention, a method of charging the plasticizing unit of an injection molding machine, includes the steps of moving a compaction ram and a storage container between a first position in which the compaction ram is in alignment with a compaction cylinder for allowing the compaction ram to compress material in the compaction cylinder, while the storage container can be charged with new material, and a second position in which the storage container is in alignment with the compaction cylinder for discharge of new material into the compaction cylinder, wherein for cleaning purposes the compaction cylinder is coupled with the compaction ram to form a structural unit which can be pulled upwards, and for assuming the operating position the structural unit is pushed downwards and the compaction cylinder is decoupled from the compaction ram.

According to another feature of the present invention, the compaction cylinder may be coupled in the operating position with a retaining flange which is securely supported by the feed pipe.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 4 is a partial cutaway view of a compaction cylinder in a position moved away from the feed pipe.

DETAILED DESCRIPTION OF PREFERRED EMBODIMENTS

Figure 1:
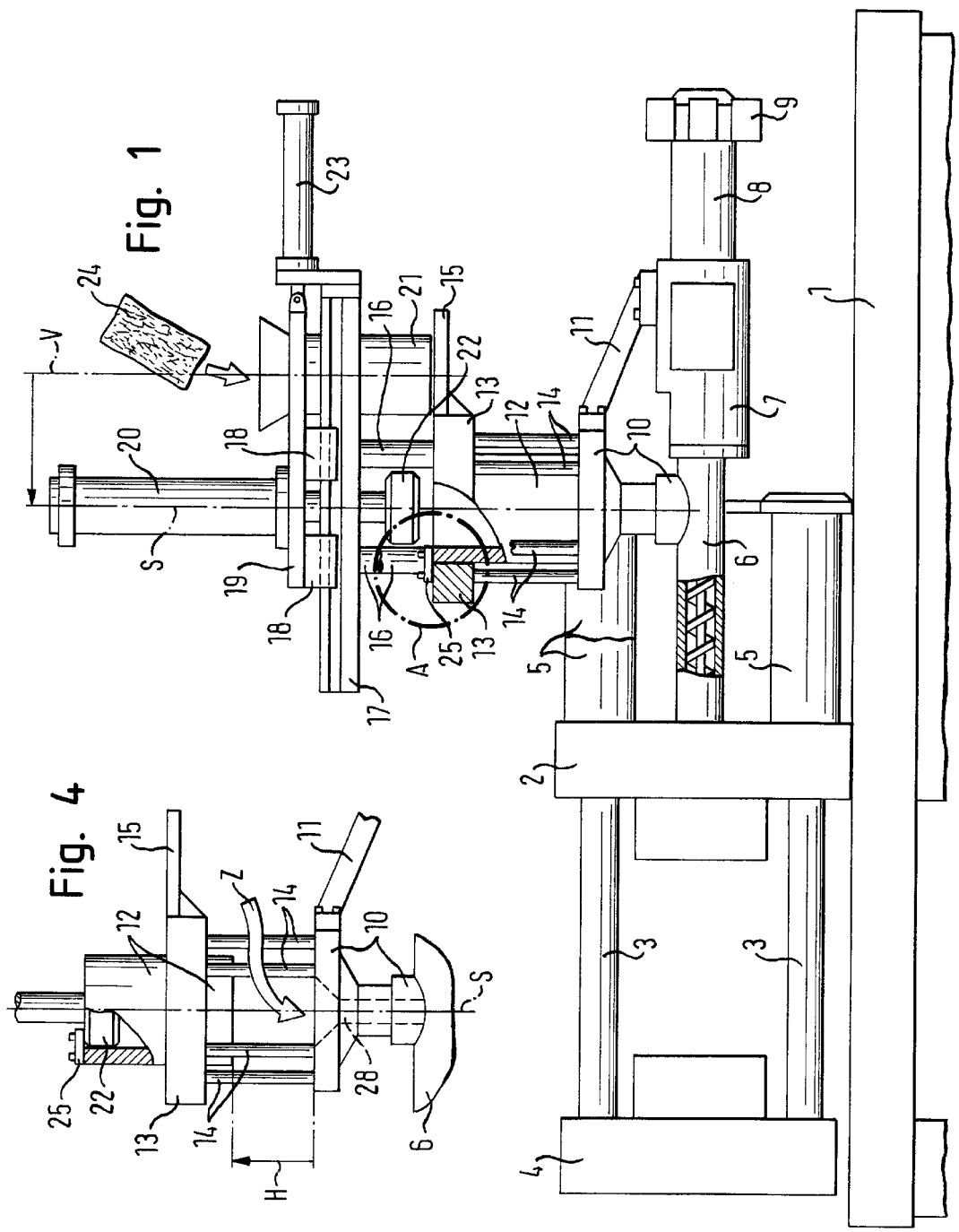
FIG. 1 is a schematic side view of a two-platen injection molding machine with a ram-type compactor for supply of bale-shaped material to a plasticizing unit of the injection molding machine.

Throughout all the Figures, same or corresponding elements are generally indicated by same reference numerals.

Turning now to the drawing, and in particular to FIG. 1, there is shown a schematic side view of a two-platen injection molding machine for supply of bale-shaped material to a plasticizing unit of the injection molding machine. The injection molding machine includes a fixed mold mounting plate 2 supported by a machine frame 1 and traversed by four tie bars 3 to which a moving mold mounting plate 4 is secured. The tie bars 3 are moved by pistons of four piston and cylinder units 5 which are secured to the fixed mold mounting plate 2. In FIG. 1, parts of the front upper piston and cylinder unit 5 are broken away to provide a view of a charging device for loading the plasticizing unit with bale-shaped material.

The plasticizing unit includes a screw cylinder 6 in which a reciprocating screw 29 is arranged for rotation and reversible motion. Connected to the screw cylinder 6 are the injection plunger housing 7, the hydraulic translational drive 8 and the hydraulic rotary drive 9. Structure and operation of the plasticizing unit are generally known to a person skilled in the art so that a detailed description thereof is omitted here for the sake of simplicity.

Arranged upon the screw cylinder 6 is a feed pipe 10, which is supported via a mounting 11 by the injection plunger housing 7. The feed pipe 10 carries a compaction cylinder 12, which is arranged with its upper end in a retaining flange 13 and is defined by a central axis S. The retaining flange 13 is connected by fastening rods 14 with the feed pipe 10. Adjoining the retaining flange 13 is a support plate 15. Two displacement rails 17 are each supported via two support pillars 16 by the retaining flange 13. In FIG. 1, only the front displacement rail 17 and the two front support pillars 16 are visible. As the left support pillar 16 is only shown partially, a third one of the support pillars 16, which is positioned behind, becomes visible.

The displacement rails 17 support via sliding blocks 18 a support base 19 for attachment of a hydraulic cylinder 20 and a cylindrical storage container 21. The storage container 21 is defined by a central axis V and has an upper end 21a, which is widened in a funnel-shaped manner, and a lower open end, which is in sliding contact with the support plate 15. The hydraulic cylinder 20 is coupled to a compaction ram 22.

The support base 19 together with the hydraulic cylinder 20, the compaction ram 22 and the storage container 21 are movable between two positions by means of a hydraulic adjustment cylinder 23, which is mounted to the displacement rails 17. In a first (right hand) position, shown in FIG. 1, the hydraulic cylinder 20 and the compaction ram 22 are aligned precisely flush with the axis S of the compaction cylinder 12 so that the compaction ram 22 can be lowered into the compaction cylinder 12. In order to realize the second, not shown, position, the support base 19 is shifted to the left until the axis V of the storage container 21 is in precise alignment with the axis S of the compaction cylinder 12, so that a material bale 24, made, e.g., of moist polyester, and previously introduced into the storage container 21, can drop into the compaction cylinder 12.

Subsequently, the hydraulic adjustment cylinder 23 is activated again to move the support plate 19 to the right into the first position, so that the compaction ram 22 is aligned precisely flush with the axis S and can be subsequently lowered under pressure to force the material contained in the compaction cylinder 12 into the feed pipe 10 and to compress the material to the required compaction pressure. The storage container 21 now assumes again the (right hand) position in FIG. 1 for receiving a new bale of material 24.

When changing one material for another material, the channel in the feed pipe 10, leading to the screw cylinder 6, has to be cleaned. To date, access was possible only via the upper opening of the compaction cylinder which access was even further narrowed by the retracted compaction ram. To address this problem of limited accessibility, the present invention provides for a coupling unit to allow a detachable connection between the compaction cylinder 12 and the compaction ram 22 to form a structural unit which can then be lifted upwards to gain direct access to the feed pipe 10 for cleaning purposes.

Figure 2:
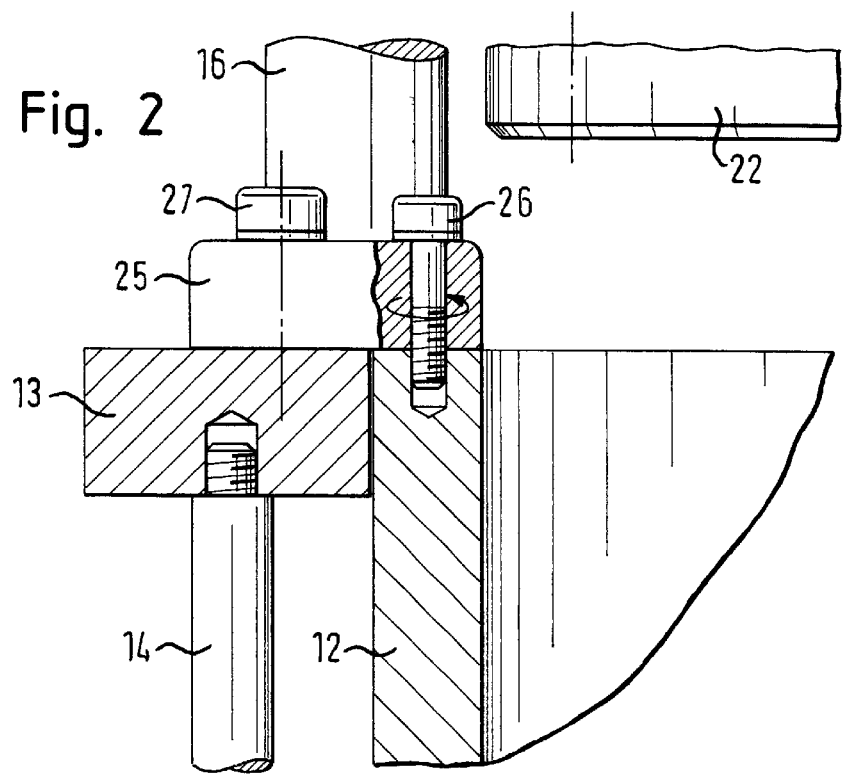
FIG. 2 is an enlarged detailed view of the area encircled in FIG. 1 and marked A, showing a coupling unit in one position.
Figure 3:
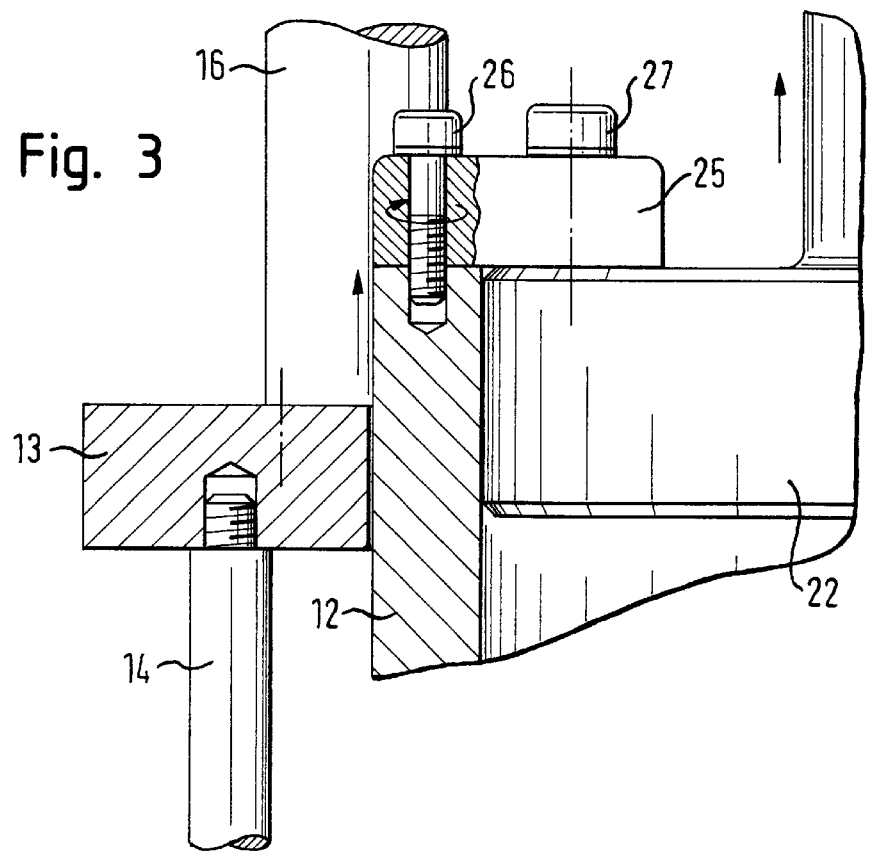
FIG. 3 is an enlarged detailed view of the area A in FIG. 1, showing the coupling unit in another position.

Turning now to FIGS. 2 and 3, there is shown a coupling unit in accordance with the present invention for connecting the compaction ram 22 with the compaction cylinder 12. The coupling unit includes a coupling piece 25 which is mounted on top of the compaction cylinder 12 by a bolt 26 which defines a pivot axis P about which the coupling piece 25 is swingable after slight loosening of the bolt 26. In FIG. 2, the coupling piece 25 is threadably engaged by the single bolt 26 to the compaction cylinder 12 and by two fastening bolts 27 in the retaining flange 13. In order to couple the compaction ram 22 with the compaction cylinder 12, the fastening bolts 27 are detached from the retaining flange 13, the coupling piece 25, after slight loosening the bolt 26, is then rotated about the pivot axis P of the bolt 26, and subsequently the fastening bolts 27 are screwed into respective threaded bores in the upper area of the compaction ram 22, which is then lowered in flush relationship with the upper rim of the compaction cylinder 12. This position is shown in FIG. 3.

As shown in FIG. 4, the structural unit comprised of compaction cylinder 12 and compaction ram 22 can then be withdrawn from the retaining flange 13 so that the lower rim of the compaction cylinder 12 clears the feed pipe 10. As a result, a wide and direct access opening (arrow Z) to the through channel 28 (shown in broken lines) is created, after lifting the structural unit of compaction cylinder 12 and compaction ram 22 along a travel path H between the lower rim of the compaction cylinder 12 and the upper rim of the feed pipe 10.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A device for charging the plasticizing unit of an injection molding machine, in particular ram-type compactor for moist polyester, comprising:

a feed pipe constructed for connection to the plasticizing unit;

a compaction cylinder having a lower end supported by the feed pipe and an upper end;

a storage container receiving material for introduction into the compaction cylinder;

a compaction ram constructed for movement into the compaction cylinder;

a retaining flange securely supported by the feed pipe and receiving the upper end of the compaction cylinder;

a drive unit for moving the compaction ram and the storage container between a first position in which the compaction ram is in alignment with the compaction cylinder for allowing the compaction ram to compress the material in the compaction cylinder, while the storage container can be charged with new material, and a second position in which the storage container is in alignment with the compaction cylinder; and a coupling unit for linking the compaction cylinder to the compaction ram.

2. The device of claim 1, wherein the drive unit has a plurality of displacement rails which are arranged at a distance to the retaining flange and along which the compaction ram and the storage container are moved between the first and second positions.

3. The device of claim 1, and further comprising a piston and cylinder unit for moving the compaction ram relative to the compaction cylinder.

4. The device of claim 1, wherein the coupling unit includes at least one coupling piece which is swingably mounted to the upper end of the compaction cylinder and selectively secureable to the retaining flange and an upper end of the compaction ram.

5. The device of claim 4, wherein the coupling piece is secured to the compaction cylinder and the retaining flange by a screwed connection.

6. The device of claim 4, wherein the coupling piece is lockable like a ratchet in a recess in the compaction ram.

7. A method of charging the plasticizing unit of an injection molding machine, comprising the steps of moving a compaction ram and a storage container between a first position in which the compaction ram is in alignment with a compaction cylinder for allowing the compaction ram to compress material in the compaction cylinder, while the storage container can be charged with new material, and a second position in which the storage container is in alignment with the compaction cylinder for discharge of new material into the compaction cylinder;

wherein for cleaning purposes the compaction cylinder is coupled with the compaction ram to form a structural unit which can be pulled upwards, and for assuming the operating position the structural unit is pushed downwards and the compaction cylinder is decoupled from the compaction ram.

8. The method of claim 7, wherein the compaction cylinder is coupled in the operating position with a retaining flange securely supported by a feed pipe constructed for connection to the plasticizing unit.

9. A charging device for an injection molding machine, comprising:

a feed pipe having a passageway for supply of material to an injection molding machine;

a compaction cylinder in communication with the feed pipe;

a compaction ram constructed for movement into the compaction cylinder to force material from the compaction cylinder into the feed pipe; and a coupling unit for detachably connecting the compaction cylinder to the compaction ram to form a structural unit that is movable away from the feed pipe to provide access to the passageway.

10. The charging device of claim 9, and further comprising a retaining flange supported by the feed pipe and receiving an upper end of the cylinder, said coupling unit including at least one coupling piece which is swingably mounted to the upper end of the compaction cylinder and selectively secureable to the retaining flange and an upper end of the compaction ram.

11. A method of operating a charging device for an injection molding machine, with the charging device having a feed pipe cooperating with the injection molding machine and receiving material from a compaction cylinder by moving a compaction ram into the cylinder, said method comprising the steps:

connecting the compaction ram to the compaction cylinder to provide a structural unit;

moving the structural unit away from the feed pipe to provide access to the feed pipe for cleaning purposes;

moving the structural unit toward the feed pipe to reestablish communication between the compaction cylinder and the feed pipe; and decoupling the compaction cylinder from the compaction ram to allow introduction of material into the compaction cylinder and compression by the compaction ram.

12. The method of claim 11, wherein the compaction cylinder is coupled in the operating position with a retaining flange securely supported by the feed pipe.

* * * * *